United States Patent [19]

Barnett

[11] Patent Number: 6,157,979
[45] Date of Patent: Dec. 5, 2000

[54] PROGRAMMABLE CONTROLLING DEVICE WITH NON-VOLATILE FERROELECTRIC STATE-MACHINES FOR RESTARTING PROCESSOR WHEN POWER IS RESTORED WITH EXECUTION STATES RETAINED IN SAID NON-VOLATILE STATE-MACHINES ON POWER DOWN

[75] Inventor: Philip C Barnett, Clanfield, United Kingdom

[73] Assignee: Advanced Technology Materials, Inc., Danbury, Conn.

[21] Appl. No.: 09/039,299

[22] Filed: Mar. 14, 1998

[51] Int. Cl.[7] ............................ G06F 13/00; G06F 12/16; G06F 1/28; G06F 1/30; G11C 11/22
[52] U.S. Cl. ........................ 710/267; 365/145; 711/100; 711/102; 711/103; 711/104; 711/107; 711/109; 713/300; 713/320; 713/340; 714/1; 714/15; 714/22
[58] Field of Search ............................ 714/15, 6, 1, 22; 710/8, 12, 129, 131, 260, 267; 365/145; 711/106, 100, 102, 103, 104, 107, 109; 713/300, 320, 340

[56] References Cited

U.S. PATENT DOCUMENTS

| | | | |
|---|---|---|---|
| 4,131,942 | 12/1978 | Gillett et al. ............................ | 364/200 |
| 4,199,810 | 4/1980 | Gunckel, II et al. ...................... | 714/15 |
| 4,382,279 | 5/1983 | Ugon ........................................ | 712/37 |
| 4,571,709 | 2/1986 | Skupnjak et al. ........................ | 365/233 |
| 4,811,294 | 3/1989 | Kobayashi et al. ................. | 365/185.22 |
| 4,873,664 | 10/1989 | Eaton, Jr. ................................ | 365/145 |
| 5,198,706 | 3/1993 | Papaliolios ............................. | 307/465 |
| 5,237,699 | 8/1993 | Little et al. .............................. | 395/750 |
| 5,327,531 | 7/1994 | Bealkowski et al. ....................... | 714/6 |
| 5,333,300 | 7/1994 | Fandrich ................................ | 395/550 |
| 5,495,437 | 2/1996 | Tai et al. ................................. | 365/145 |
| 5,502,673 | 3/1996 | Riggio, Jr. ......................... | 365/185.08 |
| 5,530,668 | 6/1996 | Chern et al. ............................ | 365/145 |
| 5,532,953 | 7/1996 | Ruesch et al. .......................... | 365/145 |
| 5,548,550 | 8/1996 | Zanders et al. ..................... | 365/185.08 |

(List continued on next page.)

FOREIGN PATENT DOCUMENTS 408264728A  3/1995  Japan .......................... H01L 27/105

OTHER PUBLICATIONS

Moazzami, Reza, "Ferroelectric Thin Film Technology for Semiconductor Memory," Semicond. Sci. Technol., vol. 10, (1995) pp. 375–390.

DeOrnellas, Steve, et al., "Plasma Etch of Ferroelectric Capacitors in FeRAMs and DRAMs",Semiconductor International, Sep. 1997, pp. 103–108.

Axe, J.D, et al, Ferroelectricity, Encyclopedia of Physics, Ed, R. Lerner and G.L. Trigg, 1991 pp. 373–376.

*Primary Examiner*—Thomas C. Lee
*Assistant Examiner*—Tanh Nguyen
*Attorney, Agent, or Firm*—Oliver A. M. Zitzmann; David G. Rasmussen

[57] ABSTRACT

An FeRAM array replaces ROM, PROM, EPROM, and/or EEPROM in a programmable controlling device and thus provides non-volatile memory cells for code stores, data stores, registers (including peripheral registers), state machines and microcode (if included) in the device. The programmable controlling device contains a processor and non-volatile ferroelectric memory cells as well as a ferroelectric memory array. The array has a code store that holds a program to control the processor, a data store that stores temporary data from the processor, and one or more registers that hold data being manipulated by the processor. The code store, data store and registers are memory mapped onto the non-volatile ferroelectric memory array. The state machines and peripheral registers are made of ferroelectric memory cells. The programmable controlling device may also include microcode that cooperates with the processor to change the function of the processor. The microcode is memory mapped onto the nonvolatile ferroelectric memory cell array.

25 Claims, 4 Drawing Sheets

U.S. PATENT DOCUMENTS

| | | | |
|---|---|---|---|
| 5,559,957 | 9/1996 | Balk | 714/23 |
| 5,559,981 | 9/1996 | Racino et al. | 711/103 |
| 5,566,318 | 10/1996 | Joseph | 711/118 |
| 5,572,459 | 11/1996 | Wilson | 365/145 |
| 5,574,679 | 11/1996 | Ohtsuki . | |
| 5,576,985 | 11/1996 | Holtz | 365/49 |
| 5,580,814 | 12/1996 | Larson | 438/3 |
| 5,592,410 | 1/1997 | Verhaeghe et al. | 365/145 |
| 5,598,569 | 1/1997 | Catherwood et al. | 714/1 |
| 5,608,246 | 3/1997 | Yeager et al. | 257/295 |
| 5,619,447 | 4/1997 | Tai | 365/145 |
| 5,638,319 | 6/1997 | Onishi et al. | 365/145 |
| 5,650,967 | 7/1997 | Seibert | 365/185.33 |
| 5,659,748 | 8/1997 | Kennedy | 713/2 |
| 5,710,515 | 1/1998 | Teggatz et al. | 324/763 |
| 5,716,875 | 2/1998 | Jones, Jr. et al. | 438/3 |
| 5,862,083 | 1/1999 | Tobita et al. | 365/185.09 |
| 5,890,199 | 3/1999 | Downs | 711/106 |
| 5,896,338 | 4/1999 | Landgraf et al. | 365/226 |
| 5,907,861 | 5/1999 | Seyyedy | 711/152 |
| 5,936,879 | 8/1999 | Brouwer et al. | 365/145 |
| 6,067,598 | 5/2000 | Roohparvar et al. | 711/103 |

PROGRAMMABLE CONTROLLING DEVICE WITH NON-VOLATILE FERROELECTRIC STATE-MACHINES FOR RESTARTING PROCESSOR WHEN POWER IS RESTORED WITH EXECUTION STATES RETAINED IN SAID NON-VOLATILE STATE-MACHINES ON POWER DOWN

BACKGROUND OF THE INVENTION

1. Field of the Invention

This invention relates generally to programmable controlling devices, and more particularly, to the internal storage of information in such devices.

2. Description of the Related Art

Computer systems are classically defined as having a processor, memory, and input/output devices. Recent advances in integrated circuit technology have allowed many of the classical computer functions to be integrated onto a single integrated circuit chip. These devices are known by a variety of terms such as microcontrollers, embedded controllers, microcomputers, and the like. However, they share a common characteristic in that they incorporate most classical computer functions on-chip. Because of their high level of integration, microcontrollers are ideal for applications such as automobile engine controllers, refrigerators, cellular telephones, remote controllers, and the like. In order to alleviate the need for external memory to store the operating program, microcontrollers commonly include nonvolatile memory in the form of read-only memory (ROM), programmable ROM (PROM), erasable programmable ROM (EPROM), electrically erasable programmable ROM (EEPROM or $E_2$PROM), or onetime programmable ROM (OTPROM). Such a processor is the industry standard 8051 originally designed by Intel shown in FIG. 1.

FIG. 1 shows external RAM 10 which is used for data storage. External ROM 12 is non-volatile memory used to store the operating program for the microcontroller 14 which is made up of microprocessor 16 and peripherals 18. External RAM 10 and external ROM 12 may or may not be on the same chip as microcontroller 14. Microprocessor 16 is composed of processor 17 and internal RAM 26. Processor 17 is made up of control 20, arithmetic logic unit (ALU) 22 and accumulator 24. Control 20 receives the program from external ROM 12, executes the program instructions and controls all signal flow in microprocessor 16. ALU 22 performs arithmetic and logic operations for the microprocessor and provides an output to the accumulator 24. Internal RAM 26 provides the internal processor control registers needed by the control 20 and accumulator 24. These registers include stack pointer 28, program counter 30, and first and second data pointers 32,34, respectively, which are used by control 20 while executing program instructions. GP registers (General Purpose registers) 36 are the registers used in the accumulator 24. Although accumulator 24 physically contains GP registers 36, the registers are shown diagrammatically in internal RAM 26. The special function registers 38 are the registers for peripherals 18 and are physically located there although they are diagrammatically shown in internal RAM 26.

Peripherals 18 provide the pathway and communications from microprocessor 16 to external devices such as a display or keyboard. I/O ports 0,1,2,3 40–46, respectively, are for the input and output of information from microprocessor 16. Timer 2, timer/counter 0, and timer/counter 1 48–52, respectively, may have values that are externally entered. Interrupt controller 54 would normally occur in conjunction with an input from one of the other peripherals. The serial UART 56 is an interface which converts the serial input from an input device such as the keyboard to bytes that may be used by microprocessor 16.

There are three types of storage elements in the microcontroller, state machines 60 in control 20, registers 38a–h in peripherals 40–54, and the internal RAM 26. The registers in peripherals 40-54 are physically located in the peripherals but are shown as the special function registers 38 in internal RAM 26. These registers are loaded under program control by the processor. They set the configuration of the peripherals. The state machines 60 in controller 20 describe the state of the processor at each point in time (i.e. processor context). As described previously, the remainder of the internal RAM 26 besides the special function registers 38 are internal process control registers which supports control 20, ALU 22, and accumulator 24.

In operation, the program is read from external ROM 12 into control 20 where the instructions are executed. State machines 60 keep the status of the processing as each instruction is executed. Stack pointer 28, program counter 30 and data pointers 32 and 34 are used by the controller during execution of the instructions. ALU 16 performs its logic functions and provides an output to accumulator 24 which uses general purpose registers 36. The data in GP registers 36 goes to I/O ports 40–46 and to a display or keyboard. The special function registers 38a–38h determine how the peripherals 18 including the I/O ports are configured.

FIG. 2 shows a simplified diagram of only the memories and processor of any generic microcontroller an example of which was shown in FIG. 1. Typically, it consists of a non-volatile code store 60 made up of ROM (read only memory) that holds the controlling program. Once loaded this store never changes even when the power is removed. An external volatile memory array of RAM, data store 62, is used to store temporary data. Working register stores 64 are internal RAM which hold data being manipulated by processor 66. In addition, the working registers 64 include peripheral registers which hold data characterizing peripherals such as I/O ports. Instructions for the processor 66 are read from the controlling program in code store 60. There may additionally be a micro-code store 68 that holds data that defines the functionality of the processor 66. State machines 70 are volatile memory which maintains the state of the processor 66 at all times.

When a programmable device such as the microcontroller shown in FIG. 2 is used to control equipment, or is a device used to replace logic, it holds its status in internal volatile working registers 64 and state machines 70. It also holds the status of the controlled peripherals (i.e. I/O ports, timers, interrupt controller in FIG. 1) in the volatile working registers 64. The conditions reached by the processor in executing its controlling software are interrelated and relatively unique for an instant in time. This information when held in volatile memories within the device has to be connected to a power source. If power is taken away, all volatile data is lost and a complex procedure is needed to re establish some semblance of the previous state. Though a nonvolatile store is often added to save critical data in the volatile registers and state machines, it can only store a minor sub set of the entire context that the control system is in at any time. This in any case increases the complexity and cost of such devices, in both hardware and software, and limits its use in certain areas.

It is known that a non-volatile memory will preserve data in the memory during a power down. One type of nonvolatile memory is a ferromagnetic memory array (FeRAM). It is useful for applications requiring data retention when power is removed from the memory. EEPROMs and FLASH EEPROMs are well known non-volatile memories that compete with ferroelectric memories in some applications.

The non-volatility of a Ferroelectric memory is due to the bistable characteristic of a ferroelectric memory cell. Two types of memory cells are used, a single capacitor memory cell and a dual capacitor memory cell. The single capacitor memory cell increases density but is less immune to noise and process variations, and requires a voltage reference for determining a stored memory state. The dual capacitor memory cell stores complementary signals allowing differential sampling of the stored information and is stable.

A dual capacitor ferroelectric memory cell in a memory array couples to a BIT and a BITBAR line that is common to many other memory types (for example, static random access memories). Memory cells of a memory block are formed in memory rows and memory columns. The dual capacitor ferroelectric memory cell comprises two transistors and two ferroelectric capacitors. A first transistor couples between the BIT line and a first capacitor. A second transistor couples between the BITBAR line and a second capacitor. The first and second capacitors have a common terminal or plate to which a signal is applied for polarizing the capacitor.

In a write operation, the first and second transistors of the dual capacitor ferroelectric memory cell are enabled to couple the capacitors to the complementary logic levels on the BIT line and the BITBAR line corresponding to a logic state to be stored in memory. The common terminal of the capacitors is pulsed during a write operation to polarize the dual capacitor memory cell to one of the two logic states.

In a read operation, the first and second transistors of the dual capacitor memory cell are enabled to couple the information stored on the first and second capacitors to the BIT line and the BITBAR line. A differential signal is generated across the BIT line and the BITBAR line by the dual capacitor memory cell. The differential signal is sensed by a sense amplifier, which provides a signal corresponding to the logic level stored in memory.

Such single and dual capacitor memory cells are shown in U.S. pat. No. 5,619,447, hereby incorporated by reference. This reference also shows an array of ferroelectric cells that form an FeRAM.

What is needed is a programmable microcontroller that does not lose its internally stored information during a power down and may be started up without rebooting at exactly the same point as where it shut down that uses simple circuitry and does not need external backup power sources.

SUMMARY OF THE INVENTION

The present invention uses an FeRAM to replace ROM, PROM, EPROM, and/or EEPROM in a programmable controlling device and thus provide non-volatile memory cells for code stores, data stores, registers (including peripheral registers), state machines and microcode (if included) in the device. The programmable controlling device contains a processor and non-volatile ferroelectric memory cells as well as a ferroelectric memory array. The array has a code store that holds a program to control the processor, a data store that stores temporary data from the processor, and one or more registers that hold data being manipulated by the processor. The code store, data store, registers are memory mapped onto the non-volatile ferroelectric memory array. The state machines and peripheral registers are made of ferroelectric memory cells. The programmable controlling device may also include microcode that cooperates with the processor to change the function of the processor. The microcode is memory mapped onto the nonvolatile ferroelectric memory cell array.

DETAILED DESCRIPTION OF THE INVENTION

Figure 3:
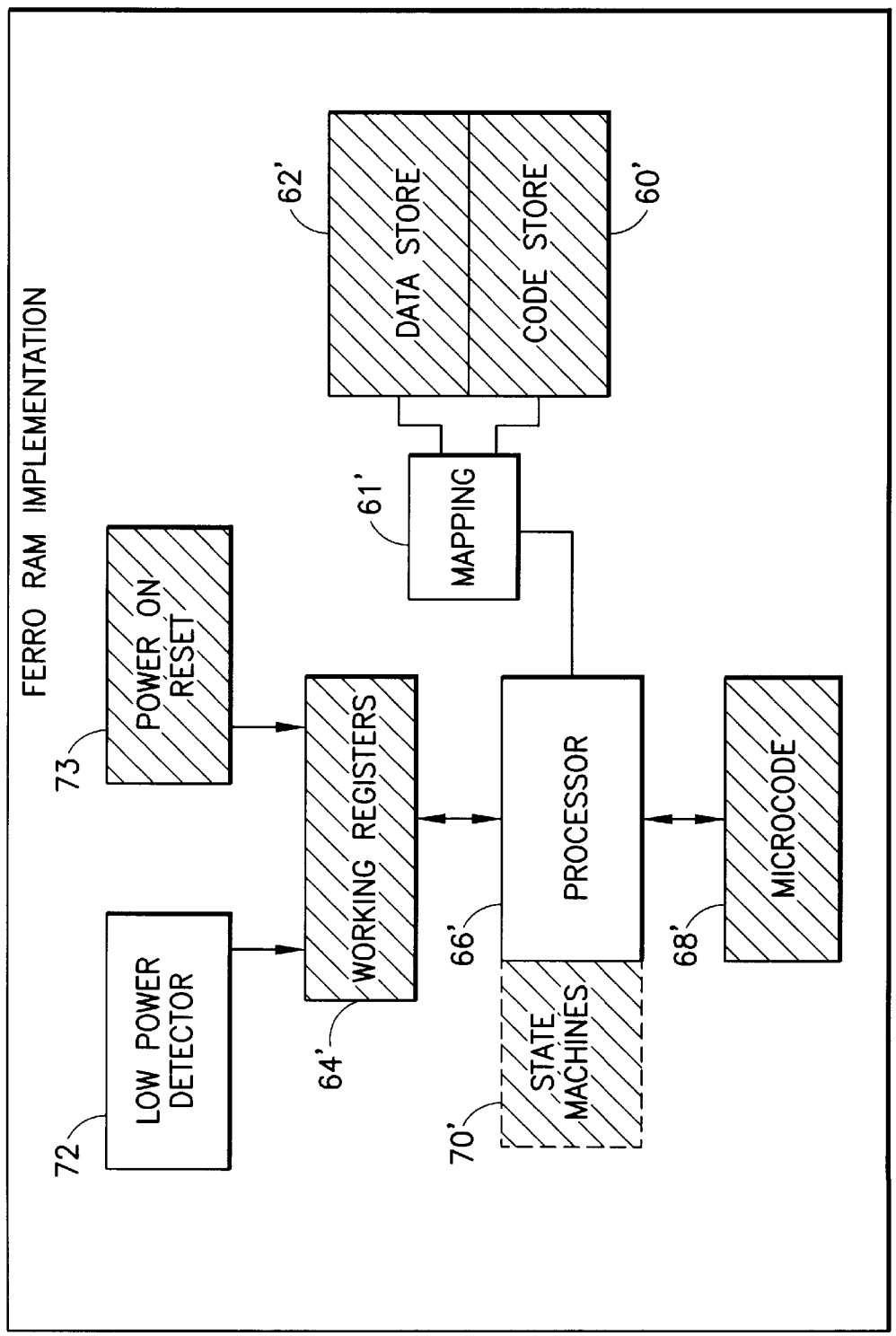
FIG. 3 is a diagram showing the memories of FIG. 2 replaced by FeRAM memory.

FIG. 3 shows the programmable control device of the invention that has replaced all internal storage elements (code store, data store, state machines, registers (including peripheral registers), and microcode) with non-volatile FeRAM. Some of the replaced storage elements are memory mapped via memory mapping unit 61' into an array of FeRAM while others are replaced by FeRAM cell groups. A non-volatile code store 60' holding the controlling program is memory mapped into the array of FeRAM. This allows the controlling program to be maintained even if power is lost. In addition, since the FeRAM is programmable it is possible to change the controlling program in the field.

A data store 62' (data RAM) is used to store temporary data, for example, data being read in or out of processor 66'. Data store 62' is memory mapped into the array of FeRAM. Implementing the data store 62' with non-volatile Ferro electric memory technology overcomes the loss of data stored during a power down and removes the need to incorporate additional non-volatile storage to duplicate information to allow for the loss of power.

State machines 70' and part of working registers 64' are both used by the processor 66'. Registers 64' used by the processor 66' are memory mapped into the array of FeRAM. State machines 70' are FeRAM cell groups. Other registers 64' are used for peripherals and are FeRAM cell groups. Registers 64' used by the processor 66' are storage elements that hold data being manipulated by the processor in accordance with instructions being read from the code store 60'. The exact state of the processor 66' is defined by the execution specific data that is contained within the registers 64' and state machines 70'.

For example, the behavior of a microcontroller that has more than one level of priority interrupt needs to know which level of interrupt has been recognized so that it can recognize higher priority interrupts and ignore lower priority interrupts. These conditions are typically handled by state machines. If power is lost when the state machine is not in the initialized condition the device looses the context it is working in. Even if the memory and register values are preserved, then the continued operation is unpredictable.

Implementing the registers 64' and state machines 70' with ferroelectric memory cells allows the execution specific data to be maintained in the event of power loss and eliminates the uncertainty. This makes it possible to stop the processor by removing the power, and resume the code execution in exactly the same place with no loss of data or configuration, when the power is reapplied. This is true also for the data for peripheral device registers. The only additional logic required is a power low detector 72, (or switch or other means) that detects low power and halts the processor at the end of the present instruction, and a power on reset 73, (or switch or other means) that ensures that the processor has its entire required signals stable before commencing execution. By halting the processor at the end of the instruction, the processor can be restarted with no loss of data. However, in another embodiment of this invention it is possible to stop the processor in the middle of the instruction and still be able to restart the processor with no loss of data. Additional layers of registers and state machines are required for the embodiment.

Microcode 68' contains information that defines how the processor 66' implements the program stored in code store 60'. Microcode 68' is memory mapped into the array of ferroelectric memory cells. Since the ferroelectric memory cells are programmable, microcode 68' can be programmed after manufacture thus allowing the programmable control device to be dynamically changed to optimize its functionality.

The use of FeRAM for code store 60', data store 62', working registers 64', state machines 70' and microcode 68' has a number of advantages. First, it allows the implementation of zero power down modes, with no special processes or chip design needed. Second, it eliminates the need to add data critical nonvolatile stores to the microcontroller. Third, it reduces silicon area used by the memories due to the cell size efficiencies of ferroelectric memories. Fourth, it removes the need for large capacitor energy stores to preserve the integrity of data in battery powered systems when battery power is removed for battery replacement.

Figure 1:
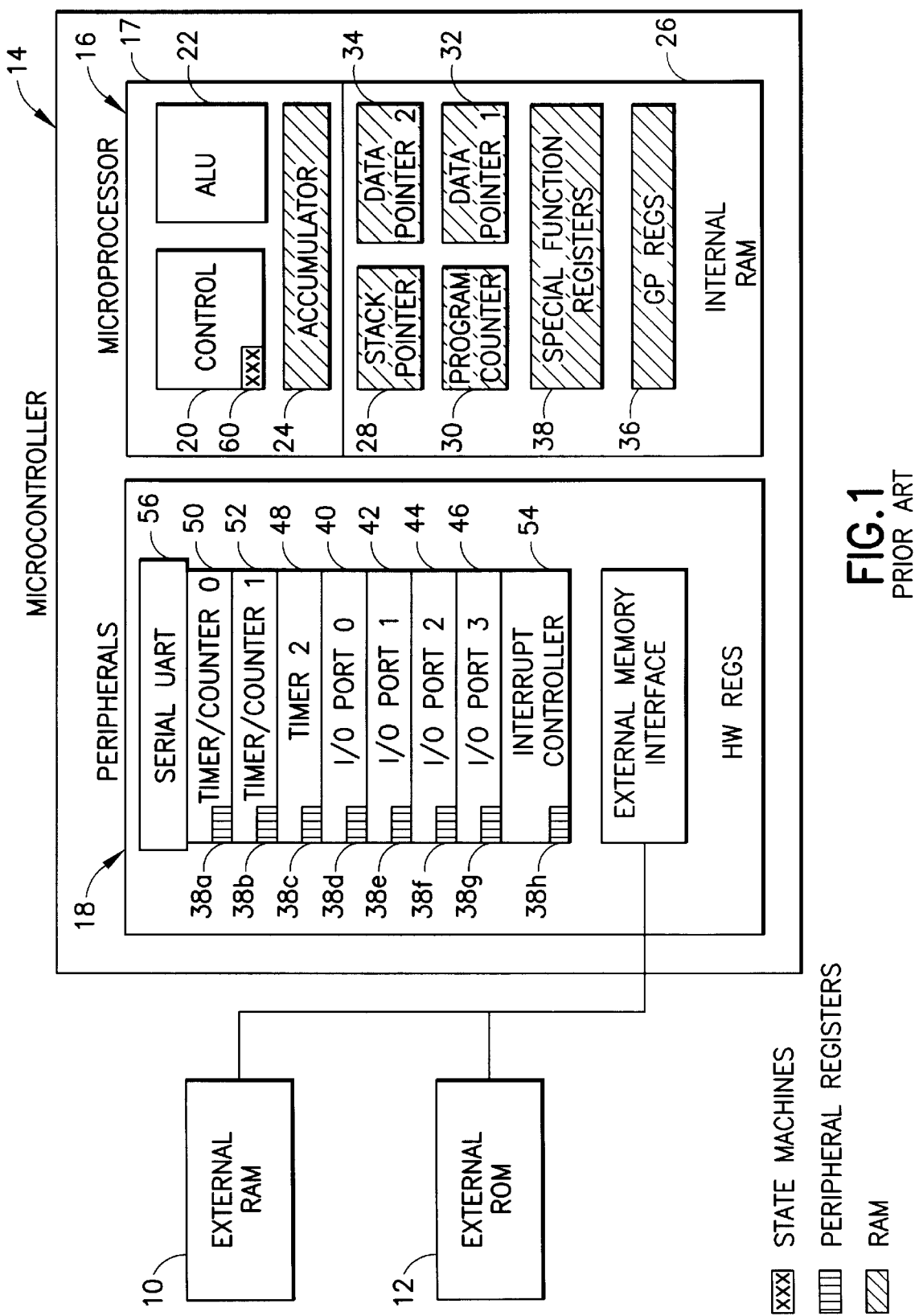
FIG. 1 is a block diagram of a prior art programmable controlling device.
Figure 2:
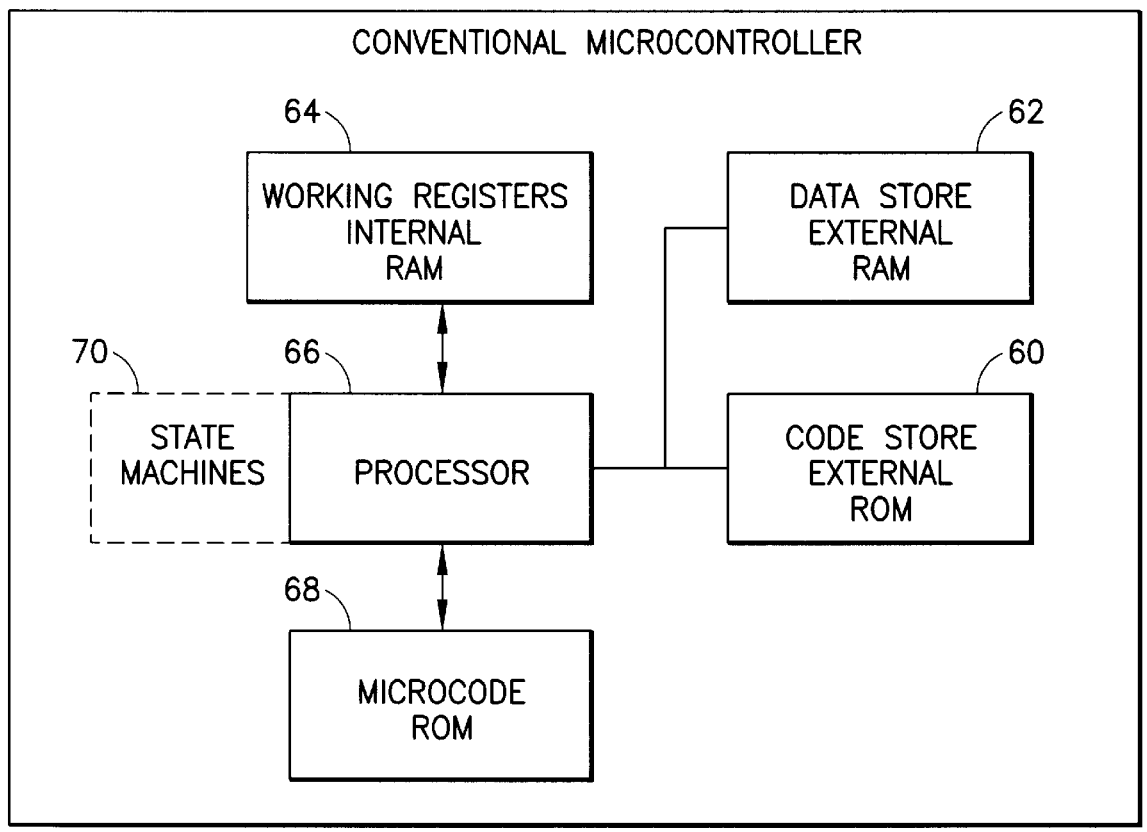
FIG. 2 is a diagram showing only the memories and associated processor of a programmable controlling device as shown in FIG. 1.

To illustrate the replacement of FeRAM for volatile memories in FIG. 3 consider as an example the architecture of the Intel 8051 microcontroller shown in FIG. 1 and the information that must be preserved to allow it to be started without rebooting. The architecture in FIG. 1 has a stack pointer register 28 that is memory mapped into the volatile RAM 26 at location 81H. In addition, the architecture has data storage, state machines and other registers including a number of Special Function Registers memory mapped into the volatile RAM or in separate registers. By looking at the sequence of operations of the stack pointer, it is possible to observe the relationship of the stack pointer register, the data storage and other memory mapped registers, where data may reside during the stack pointer operation and thus what data may be lost if there is a power down.

During the operation of the microcontroller, data location 81 H contains an 8-bit value of the stack pointer 28. When the software calls a sub routine, using the Absolute Call instruction, the address of the next instruction is stored using the value in the stack pointer, so that when the sub routine executes the return instruction the subsequent instruction is executed. The program counter register 30 (PC) is used as the pointer to where it next fetches instructions. The Assembler mnemonic Acall Subrtn when executed would have the following effect.

PC←PC+2; PC set to next instruction as Acall instruction is two bytes

SP←SP+1; SP points to next unused location (SP)←$PC_{7-0}$; Low byte of PC stored in location SP points to SP←SP+1; SP points to next unused location (SP)←$PC_{15-8}$; High byte of PC stored in location SP points to PC←Subrtn; Program counter loaded with sub routine address so that next instruction executed is the sub routine.

Figure 4:
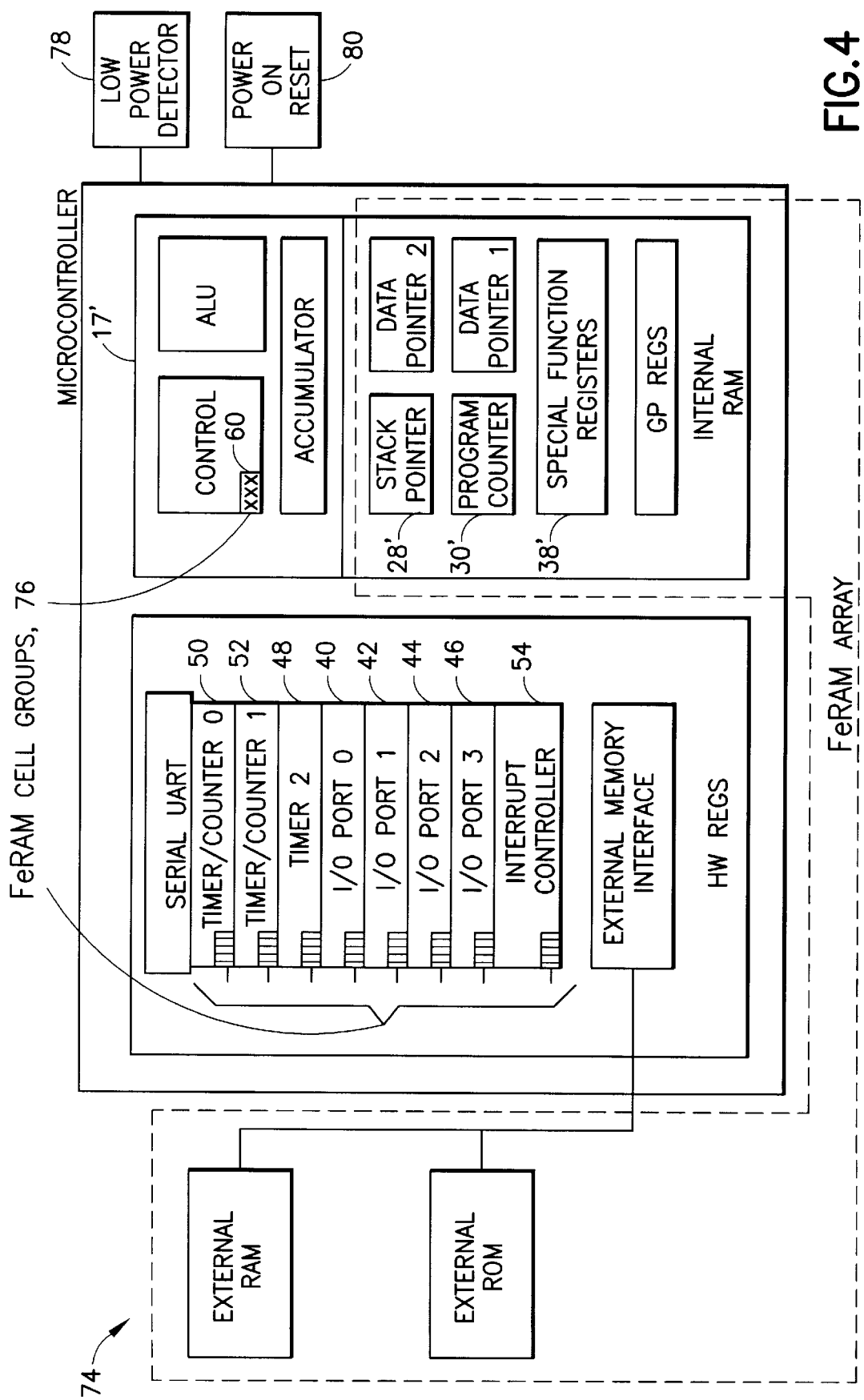
FIG. 4 is a diagram showing one embodiment of the invention including the microprocessor of claim 1 in which FeRAM replaces volatile RAM and other storage elements.

To be able to preserve this information in the event of a power down, FIG. 4 shows the same 8051 microprocessor as in FIG. 1 with an FeRAM array 74 and FeRAM cell groups 76 to replace the volatile RAM and other storage elements shown in FIG. 1. The stored return address, the stack pointer 28' that contains the return address location, the program counter 30' and state machines 60' are all preserved in nonvolatile FeRAM. State machines 60' are preserved in FeRAM cell group 76. Thus, all the information required by processor 17' to restart without rebooting is preserved even when there is a power loss. This does not alter the architecture of the device thus making it software compatible with the existing devices that use volatile technology.

The Special Function Registers 38' are used as the interface between the processor special control blocks, and input/output ports. Although the Special Function Registers 38' are shown in the FeRAM array 74 they are located in the peripherals 40'–54' and are composed of FeRAM cell groups 76. Although the special function registers are hardware extensions to the architecture, they appear to the processor as memory. These ports are invariably programmable by the processor for flexibility. By incorporating FeRAM cell groups as the configuration storage elements, removing and restoring the power to the device has no effect on the continued operation.

The only additional circuitry required for the 8051 if FeRAM were used would be a low power detector 78 and sufficient internal energy storage that would ensure that the complete instruction is executed and the processor is then stopped before the applied voltage goes so low that the devices operation becomes unpredictable. At power up, power on reset circuitry 80 would detect when the voltage is high enough to ensure successful operation, and that other essential signals CLK etc. are stable, the processing would then continue as if the voltage had never been removed.

The use of an EPROM is not an option as a non-volatile storage component in most microprocessor applications because it has asymmetric read and write performance. The read may be done in nanoseconds but the write cycle may take milliseconds which is far to slow for a microprocessor.

While the preferred embodiments of the invention have been shown and described, numerous variations and alternative embodiments will occur to those skilled in the art. Accordingly, it is intended that the invention be limited only in terms of the appended claims.

I claim:

1. A programmable controlling device comprising:

a processor, a plurality of state machines within said processor to indicate the status of said processor, said state machines made up of non-volatile ferroelectric memory cells, wherein when the power to said device goes down, the current execution states in said state machines are immediately retained in said nonvolatile ferroelectric memory cells without being propagted into predetermined states and/or without being saved in a non-volatile memory different than the non-volatile ferroelectric memory cells of said state machines, and when the Rower to said device is restored, said state machines allow said processor to be restarted with said retained execution states in exactly the same condition as when the Power went down.

2. The programmable controlling device of claim 1 including a detector cooperating with said processor to detect low power to said processor.

3. The programmable controlling device of claim 2 including a switch cooperating with said processor to halt said processor during an instruction when said low power is detected.

4. The programmable controlling device of claim 2 including a switch cooperating with said processor to halt said processor at the end of an instruction when said low power is detected.

5. The programmable controlling device of claim 3 or 4 including a reset cooperating with said processor that ensures that the processor has all of its required signals stable before commencing execution of instructions.

6. The programmable controlling device of claim 1 including one or more internal processor control registers cooperating with said processor that hold data being manipulated by said processor, said internal processor control registers made up of non-volatile ferroelectric memory cells.

7. The programmable controlling device of claim 6 in which said internal processor control registers include a stack pointer, a program counter, and one or more data pointers.

8. The programmable controlling device of claim 7 in which said internal processor control registers are part of a ferroelectric memory array.

9. The programmable controlling device of claim 1 or 6 including one or more peripherals having special function registers, said peripherals providing the communication from said processor to external devices, said special function registers containing information for the configuration of said peripherals, said special function registers made up of non-volatile ferroelectric memory cells.

10. The programmable controlling device of claims 1 or 6 including a code store cooperating with said processor, said code store containing a program to control said processor, said code store made up of non-volatile ferroelectric memory cells.

11. The programmable controlling device of claim 9 including a code store cooperating with said processor, said code store containing a program to control said processor, said code store made up of non-volatile ferroelectric memory cells.

12. The programmable controlling device of claim 9 including a data store cooperating with said processor, said data store for storing temporary data from said processor.

13. A programmable controlling device comprising:
   a processor,
   a plurality of state machines within said processor to indicate the status of said processor, said state machines made up of non-volatile ferroelectric memory cells, wherein when the power to said device goes down, the current execution states in said state machines are immediately retained in said nonvolatile ferroelectric memory cells without being propagated into predetermined states and/or without being saved in a non-volatile memory different than the non-volatile ferroelectric memory cells of said state machines, and when the power to said device is restored, said state machines allow said processor to be restarted with said retained execution states in exactly the same condition as when the power went down,
   one or more internal processor control registers cooperating with said processor that hold data being manipulated by said processor,
   said registers made up of non-volatile ferroelectric memory cells.

14. The programmable controlling device of claim 13 in which said one or more of said non-volatile ferroelectric memory cells are in a memory array.

15. The programmable controlling device of claim 13 including a detector cooperating with said processor that detects low power to said processor.

16. The programmable controlling device of claim 13 including a switch cooperating with said processor that halts said processor during the instruction when low power is detected.

17. The programmable controlling device of claim 13 including a switch cooperating with said processor that halts said processor at the end of an instruction when low power is detected.

18. The programmable controlling device of claim 16 or 17 including a reset cooperating with said processor that ensures that the processor has all of its required signals stable before commencing execution of instructions.

19. The programmable controlling device of claim 18 in which said internal processor control registers include a stack pointer, a program counter, and one or more data pointers.

20. The programmable controlling device of claim 19 in which said stack pointer, program counter, and one or more data pointers are in a ferroelectric memory array.

21. The programmable controlling device of claims 13 or 17 including one or more peripherals having special function registers, said peripherals communicating between said processor and external devices, said special function registers containing information for the configuration of said peripherals, said special function registers made up of non-volatile ferroelectric memory cells.

22. The programmable controlling device of claim 21 including a code store cooperating with said processor that holds a program to control said processor, said code store made up of a ferroelectric memory array.

23. The programmable controlling device of claim 21 including a data store cooperating with said processor that stores temporary data from said processor, said data store made up of a ferroelectric memory array.

24. A programmable controlling device comprising:
   a processor,
   a plurality of state machines within said processor to indicate the status of said processor, said state machines made up of non-volatile ferroelectric memory cells, wherein when the power to said device goes down, the current execution states in said state machines are immediately retained in said nonvolatile ferroelectric memory cells without being propagted into predetermined states and/or without being saved in a non-volatile memory different than the non-volatile ferroelectric memory cells of said state machines, and when the power to said device is restored, said state machines allow said processor to be restarted with said retained execution states in exactly the same condition as when the power went down,
   a ferroelectric memory array having,
      i) a code store cooperating with said processor that holds a program to control said processor,
      ii) a data store cooperating with said processor that stores temporary data from said processor,
      iii) one or more internal processor control registers cooperating with said processor that hold data being manipulated by said processor, said code store, data store, one or more internal processor control registers and memory mapped onto said memory array.

25. The programmable controlling device of claim 24 including one or more peripherals having special function registers, said peripherals providing communication between said processor and external devices, said special function registers containing information for the configuration of said peripherals, said special function registers made up of non-volatile ferroelectric memory cells.

* * * * *